United States Patent
Holtskampf

(10) Patent No.: US 7,621,069 B2
(45) Date of Patent: Nov. 24, 2009

(54) FISHING ACCESSORY METHOD OF SECURING A LURE TO A FISHING HOOK, AND METHOD OF ATTACHING A BODY TO A FISHING LINE

(76) Inventor: Francis Archibald Holtskampf, 1 Erica Road, George 6529 (ZA)

( * ) Notice: Subject to any disclaimer, the term of this patent is extended or adjusted under 35 U.S.C. 154(b) by 664 days.

(21) Appl. No.: 10/480,088

(22) PCT Filed: May 24, 2002

(86) PCT No.: PCT/IB02/01806

§ 371 (c)(1),
(2), (4) Date: Jun. 4, 2004

(87) PCT Pub. No.: WO02/100165

PCT Pub. Date: Dec. 19, 2002

(65) Prior Publication Data

US 2004/0216360 A1 Nov. 4, 2004

(30) Foreign Application Priority Data

Jun. 11, 2001 (ZA) ..................................... 01/4735

(51) Int. Cl.
*A01K 85/00* (2006.01)
(52) U.S. Cl. ....................... 43/42.39; 43/44.9; 43/44.91
(58) Field of Classification Search ................ 43/42.39, 43/44.9, 44.91, 44.2, 44.4, 44.8
See application file for complete search history.

(56) References Cited

U.S. PATENT DOCUMENTS

| | | | | |
|---|---|---|---|---|
| 2,501,634 A | * | 3/1950 | Rector | 43/44.89 |
| 2,518,031 A | * | 8/1950 | Lane | 43/42.2 |
| 2,712,194 A | * | 7/1955 | Di Stefano | 43/15 |
| 3,758,979 A | * | 9/1973 | Martuch et al. | 43/44.98 |
| 4,615,136 A | * | 10/1986 | Bank | 43/44.91 |
| 4,644,681 A | * | 2/1987 | Hutson | 43/44.91 |
| 5,025,586 A | * | 6/1991 | Pixton | 43/42.24 |
| 5,218,780 A | * | 6/1993 | Jacobson | 43/44.4 |
| 5,369,905 A | * | 12/1994 | DeMars | 43/42.74 |
| 5,666,760 A | * | 9/1997 | Bramblett et al. | 43/44.83 |
| 5,680,726 A | * | 10/1997 | Sassone | 43/43.16 |
| 5,832,655 A | * | 11/1998 | Crumrine | 43/42.39 |
| 7,069,686 B1 | * | 7/2006 | Tamian | 43/42.72 |

OTHER PUBLICATIONS

International Search Report; PCT/IB02/01806; May 24, 2002; Kurt Rowan; Dec. 2, 2002.

* cited by examiner

*Primary Examiner*—Michael R Mansen
*Assistant Examiner*—Valentina Xavier
(74) *Attorney, Agent, or Firm*—Skinner & Associates

(57) ABSTRACT

A fishing accessory is provided which includes a body defining a longitudinal passage in which a fishing line is receivable, and defining a slot extending laterally from the passage to an outside of the body. A resilient helical element is axially receivable within the passage with an interference fit, and extends helically from a rear end of the body to engage a fishing lure, disposed on a fishing hook. The accessory is secured on the fishing line by passing the fishing line through the slot into the passage, winding the fishing line through adjacent coils of the helical element, sliding the helical element into the passage, and securing a rear end of the helical element to the lure. A locking member may also be inserted into the passage. The fishing accessory may be installed on the fishing line without having to untie the fishing line from the fishing hook.

8 Claims, 3 Drawing Sheets

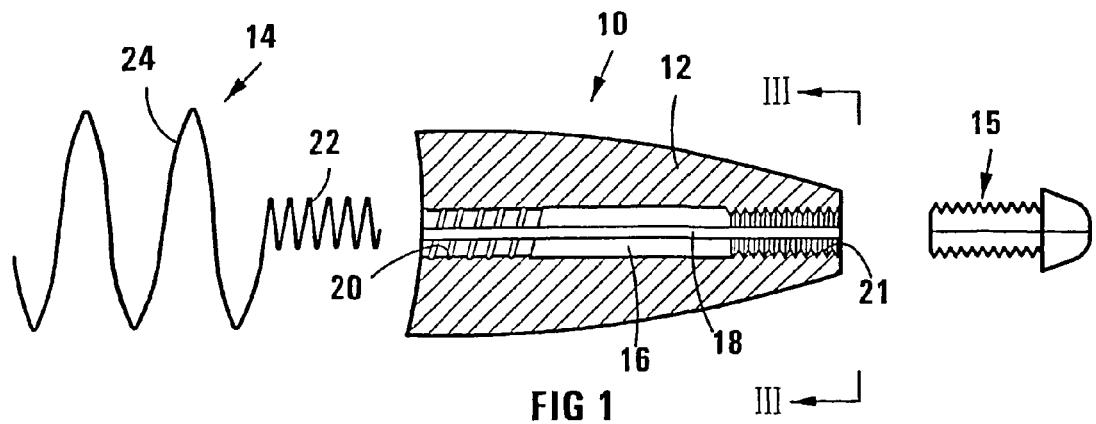
FIG 1
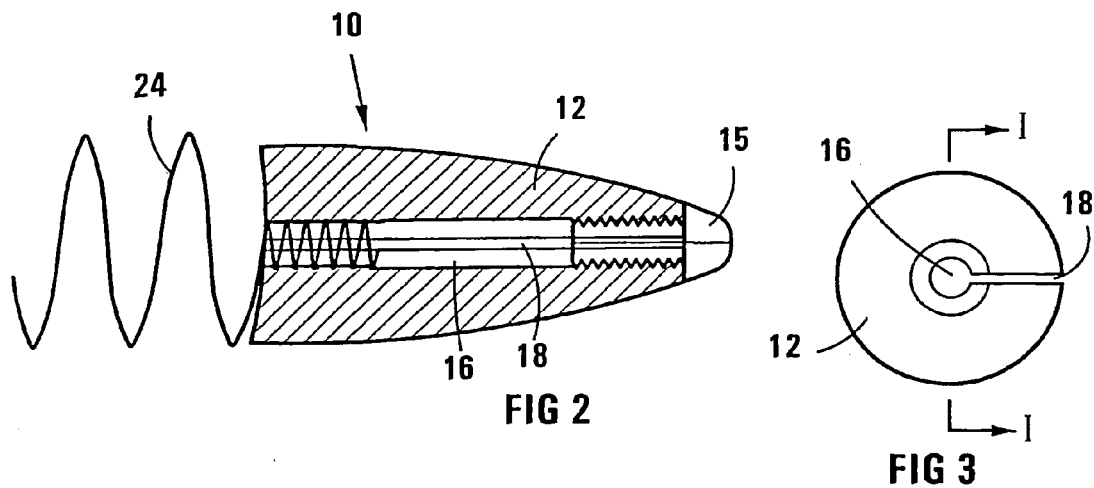
FIG 2
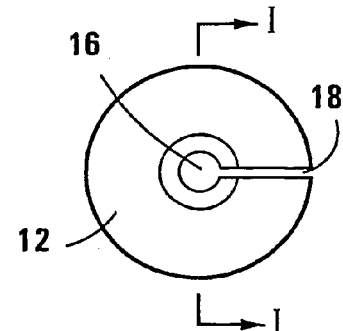
FIG 3
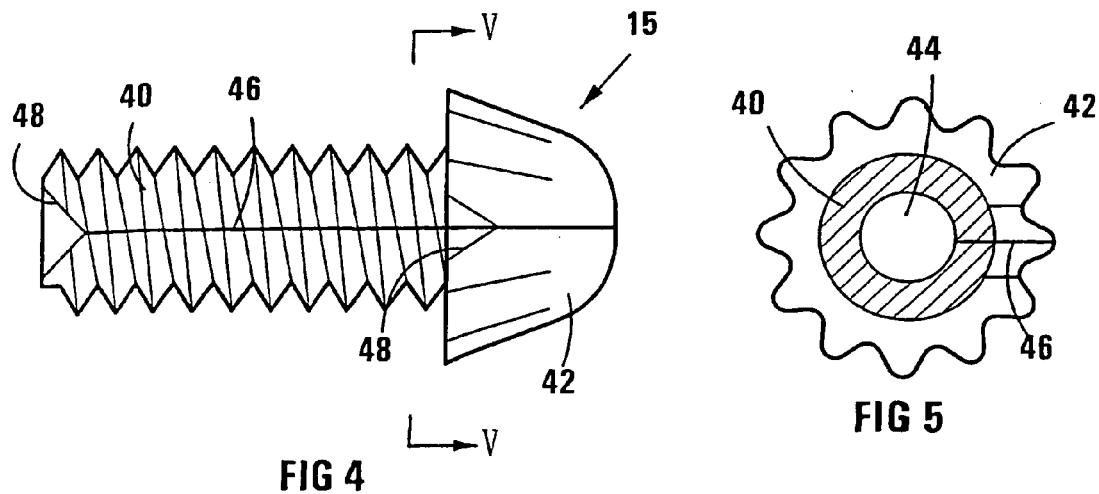
FIG 4
FIG 5

FISHING ACCESSORY METHOD OF SECURING A LURE TO A FISHING HOOK, AND METHOD OF ATTACHING A BODY TO A FISHING LINE

FIELD OF THE INVENTION

THIS INVENTION relates to fishing accessories. Particularly, it relates to a fishing accessory, a method of attaching a body to a fishing line, and to a method of securing a fishing lure to a fishing hook.

BACKGROUND OF THE INVENTION

Bodies such as sinkers or floats often need to be attached to fishing lines or lures, to regulate the buoyancy of the fishing line or lure. When fishing, it may be required to change or re-install a sinker, and this should preferably be done without having to re-tie the fishing line to a fishing hook.

The term "lure" is to be interpreted broadly, so as to include artificial lures (e.g. soft plastic lures) and also real or non-artificial bait. The term "interference fit" is to be interpreted broadly, so as to include sliding engagement, frictional engagement, screw-threaded engagement, and the like.

SUMMARY OF THE INVENTION

According to a first aspect of the invention there is provided a fishing accessory which comprises:
  a body defining a longitudinal passage in which a fishing line is receivable and defining a slot extending laterally from the passage to an outside of the body; and
  a resilient helical element which is axially receivable, at least in part, within the passage, with an interference fit between the helical element and a surface of the passage, holding the helical element in position in the passage.

The diameter of the passage may be greater than the width of the slot.

A fishing line may be passed sideways into or out of the passage, via the slot, thus enabling the fishing accessory to be installed on the fishing line without having to untie the fishing line from a fishing hook.

A helical groove may be defined in a surface of the passage, the pitch of the helical groove corresponding to the pitch of the helical element, so that the helical element can engage the helical groove, when received within the passage.

The accessory may include a locking member defining a longitudinal slot, the locking member being receivable on the body, and being accurately displaceable between a receiving position in which the slot of the locking member is in register with the passage and the slot of the body, and a locking position in which the slot of the locking member is in register only with the passage of the body, and is out of register with the slot of the body.

The locking element may be attachable to the body by way of screw-threaded engagement and may be a moulding of plastics material, e.g. it may be injection moulded.

The helical element may include a body engagement part and a lure engagement part, the lure engagement part comprising an elongate element having a helical shape with a wider diameter than the body engagement part. The coils of the body engagement part may have an inner diameter which is smaller than the outer diameter of a hook eye of a fishing hook.

According to another aspect of the invention, there is provided a fishing accessory which comprises a body defining a longitudinal passage in which a fishing line is receivable; and a helical element extending from one end of the body, the helical element being configured to engage a fishing lure disposed on a fishing hook and to surround a hook eye of the fishing hook, from which a fishing line extends through the longitudinal passage. By engaging the fishing lure, the helical element may attach the fishing accessory to the lure and may assist in holding the fishing lure in position on the fishing hook.

According to a further aspect of the invention there is provided a fishing accessory which comprises:
  a body defining a longitudinal passage in which a fishing line is receivable and a slot extending laterally from the passage to an outside of the body, a female screw thread being defined in the passage, extending from one end of the body for at least a part of the length of the passage;
  an elongate locking element defining a male screw thread on its outside, complemental to the screw thread defined in the passage, a longitudinal slot being defined in the locking element which is in register with the passage, when the locking element is screw-threadedly received in the passage; and
  a helical element extending from one end of the body, the helical element being configured to engage a fishing lure disposed on a fishing hook, from which a fishing line extends through the longitudinal passage, in use.

The body may be a sinker or may be a float, and the helical element may be a metal coil spring.

According to yet a further aspect of the invention there is provided a method of attaching a body to a fishing line, the method including the steps of:
  receiving the fishing line in a passage defined in the body; and
  positioning a resilient helical element around the fishing line, such that the helical element is held in position in the passage by way of an interference fit between the helical element and a surface of the passage, and holds the line captive within the passage.

The fishing line may be received in the passage by sliding it sideways into the passage via a slot defined in the body and extending laterally from the passage to an outside of the body. The helical element may be positioned around the fishing line by rotating it about its axis relative to the fishing line, or by winding the fishing line through the gap between adjacent coils of the helical element. The fishing line can thus be received in the passage and the helical element can be positioned around the fishing line, without having to untie the fishing line from a fishing hook.

The step of positioning the helical element may comprise:
exerting a twisting load on the helical element about its axis, to deform it elastically to reduce its diameter;
moving the helical element axially into the passage; and
releasing the twisting load, to allow the helical element to expand radially and engage the surface of the passage.

According to yet a further aspect of the invention there is provided a method of securing a fishing lure to a fishing hook, the method comprising:
causing the fishing hook to pass longitudinally through a nose portion of the lure so that the nose portion is adjacent the hook eye of the fishing hook; and
screwing a helical element longitudinally towards said nose portion, in a direction from the nose end of the lure towards the tail end thereof, so that the helical element engages said nose portion, and surrounds the hook eye, the helical element including coils which have an inner diameter which is smaller than the outer diameter of the hook eye, thereby attaching the fishing accessory to the lure and assisting in holding the nose portion of the lure in position on the fishing hook, in the hook eye region of the hook. This assists in preventing the nose from sliding along the shank part of the hook towards the hook part thereof during use, causing so-called "wadding" which is not desired.

The helical element may engage the nose portion of the lure by extending underneath an outer surface of said nose portion, or by extending around an outside of said nose portion.

The invention will now be described, by way of non-limiting example, with reference to the drawings.

BRIEF DESCRIPTION OF THE DRAWINGS

FIG. 1 shows an exploded side elevational view of a first embodiment of a fishing accessory in accordance with the invention, the body of the accessory being shown in longitudinal section;

FIG. 2 shows a side elevational view of the fishing accessory of FIG. 1 in an assembled condition;

FIG. 3 shows a sectional view taken on line III-III in FIG. 1;

FIG. 4 shows a detail side view, drawn to a larger scale, of a locking member of the fishing accessory of FIG. 1;

FIG. 5 shows a sectional view taken on V-V in FIG. 4;

DESCRIPTION OF THE INVENTION

Figure 6:
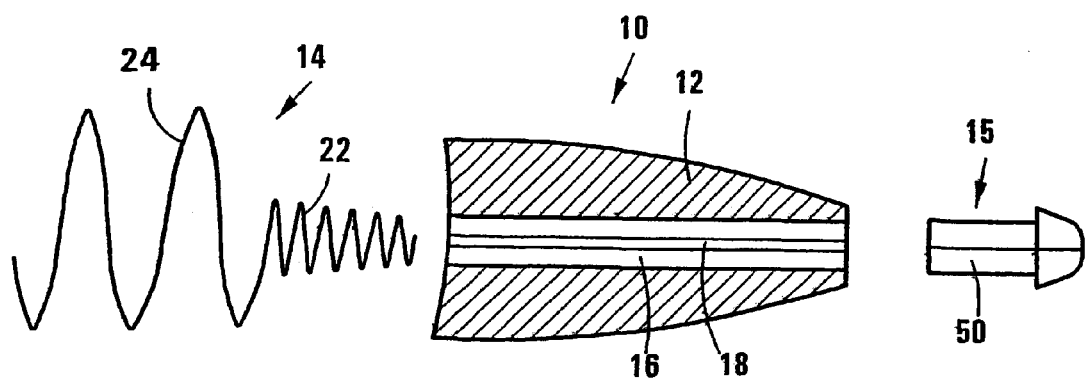
FIG. 6 shows an exploded sectional side elevational view of a second embodiment of a fishing accessory in accordance with the invention.

Referring to FIGS. 1 to 3 of the drawings, reference numeral 10 generally refers to a first embodiment of a fishing accessory, comprising three components, namely a body which is in the form of a sinker 12, a helical element 14 and a locking member 15.

The sinker 12 can be of a suitable metal such as lead. It has a longitudinally extending passage 16 therethrough, and a slot 18 extending laterally from the passage to an outside of the sinker 12, through which a fishing line can pass laterally into or out of the passage. The sinker 12 has, in the surface defining the passage 16, a helical groove 20 at a rear end thereof, and a female screw-thread 21 at a front end of thereof.

The helical element 14 comprises a helically coiled body engagement front part 22 and a lure engagement rear part 24 which is also in the form of a helically coiled element, being an extension of the front part 22. The coils of the rear part 24 have a larger diameter than that of the coils of the front part 22. The helical element 14 is a resilient coil spring made from a metal wire.

The helical element 14 can be engaged with the sinker 12 by screwing the front part 22 from the rear end of the sinker axially into the passage 16, so that the coils of the front part 22 engage with the helical groove 20. Once the helical element 14 has been screwed in fully, it is held in position in the passage 16 by an interference fit between the front part 22 and the surface defining the passage, the rear part 24 will protrude from the rear end of the sinker.

Referring now to FIGS. 4 and 5 of the drawings, the locking member 15 is an injection moulded plastics component. It comprises a threaded part 40 which can engage with the female screw thread 21, and a head 42. As can best be seen in FIG. 5 of the drawings, the head is fluted so as to facilitate rotation thereof by hand. The locking member 15 has a longitudinally extending slot comprising a passage 44, and a lateral split on one side, the split being indicated by reference numeral 46. The material from which the locking member 15 is made is sufficiently resiliently flexible to enable the split to open up so as to allow the passage of a fishing line therethrough, into or out of the passage 44. To facilitate insertion of the fishing line, the slit is formed with V-shaped notches 48.

Figures 7, 8:
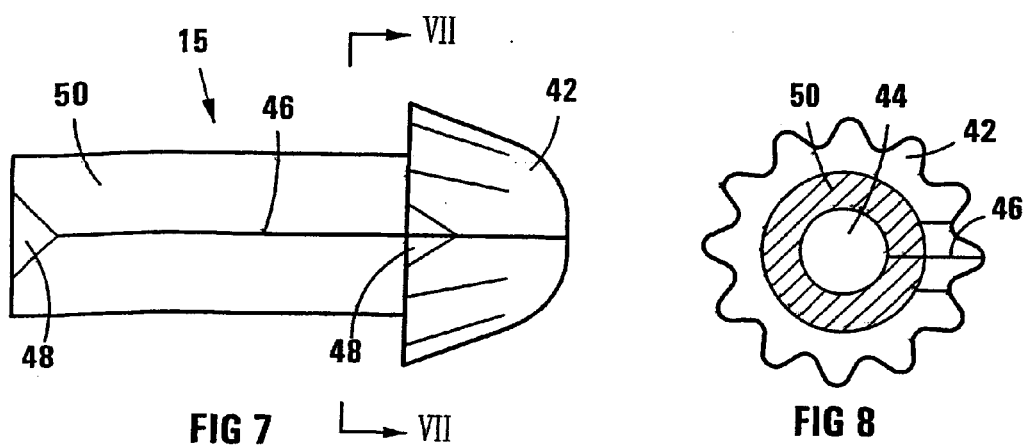
FIG. 7 shows a detailed side view, drawn to a larger scale, of a locking member of the fishing accessory of FIG. 6.
FIG. 8 shows a sectional view taken on VIII-VIII in FIG. 7.

Referring to FIGS. 6 to 8 of the drawings, a fishing accessory in accordance with a second embodiment of the invention is generally indicated by reference numeral 10 and includes a sinker 12, a helical element 14, and a locking member 15, similar to the sinker, helical element, and locking member of the first embodiment of the invention, shown in FIGS. 1 to 3 of the drawings. In this embodiment of the invention, the passage 16 is cylindrical and does not define a helical groove or a female screw thread. Similarly, the locking member 15 does not include a threaded part, but instead has a cylindrical rear part 50. The front part 22 of the helical element 14 is inserted into the passage 16 by exerting a twisting load on the helical element, so that it is elastically deformed and the diameter of the front part is temporarily elastically reduced. The front part 22 is inserted axially into the passage 16 and the twisting load is released, so that the coils of the helical element 14 elastically expand radially, so that the front part engages the surface of the passage with an outwardly elastic bias. This process of positioning the front part 22 of the helical element 14 in the passage 16 can be repeated, each time causing further axial penetration of the front part into the passage. The twisting load is typically exerted by gripping the rear part 24 of the helical element 14, and twisting it while inserting the front part 22 into the passage 16.

Figure 9:
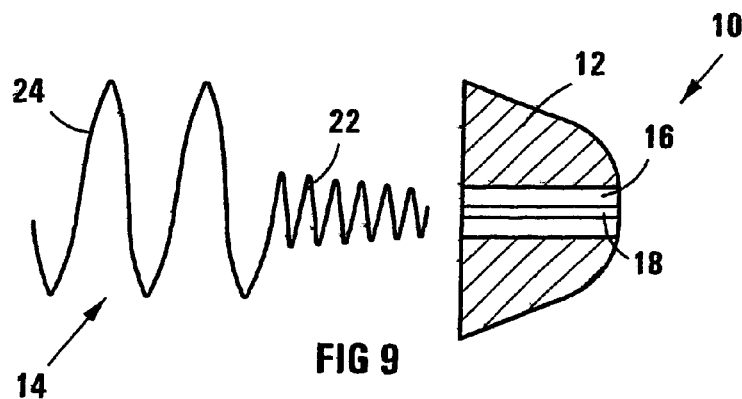
FIG. 9 shows an exploded side elevational view of a third embodiment of a fishing accessory in accordance with the invention.

Referring to FIG. 9 of the drawings, a fishing accessory in accordance with a third embodiment of the invention is generally indicated by reference numeral 10 and includes a sinker 12 and a helical element 14, similar to the sinker and helical element of the second embodiment of the invention shown in FIGS. 6 to 8 of the drawings, except that the sinker 12 is shorter in length, so that the length of the passage 16 is substantially equal to the length of the front part 22 of the helical element 14. The front part 22 is tapered in frusto conical fashion, similar to the front part of the helical element shown in FIG. 6 of the drawings.

In this embodiment of the invention, the front part 22 is inserted into the passage 16 in the same way as that used in the second embodiment of the invention, shown in FIGS. 6 to 8 of the drawings, so that the front part extends the entire length of the passage 16 to hold a fishing line captive within the passage, without the need for a locking member to be installed in the passage.

Figure 10:
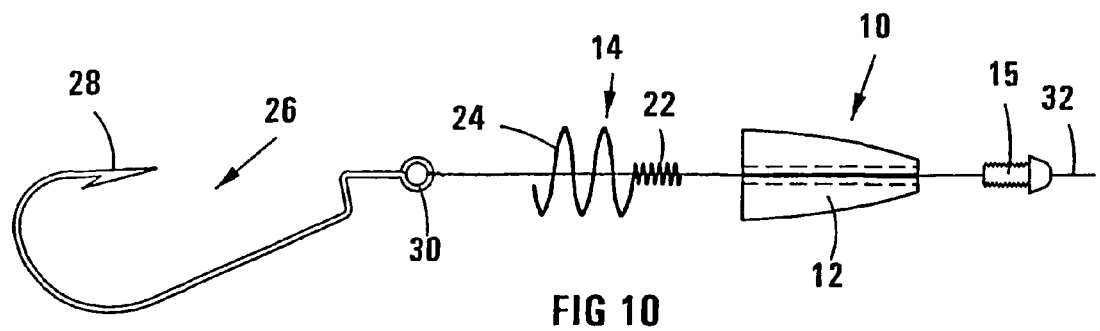
FIGS. 10 to 12 illustrate how the fishing accessory of FIGS. 1 to 3 and a fishing lure, are attached to a fishing hook.
Figure 11:
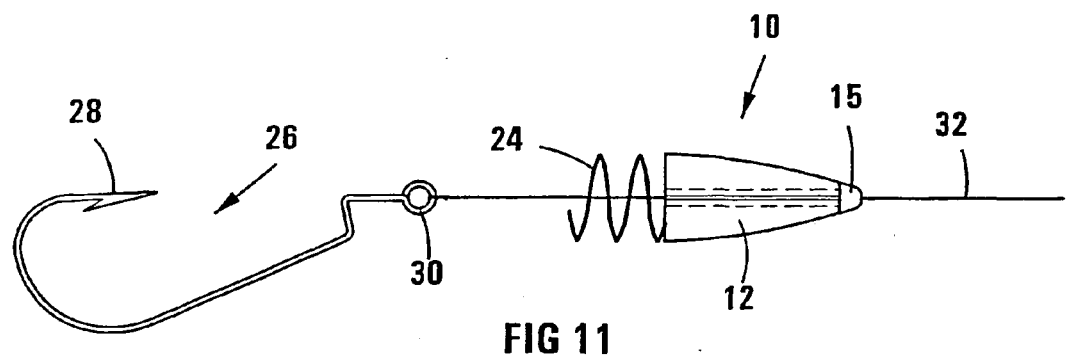
Figure 12:
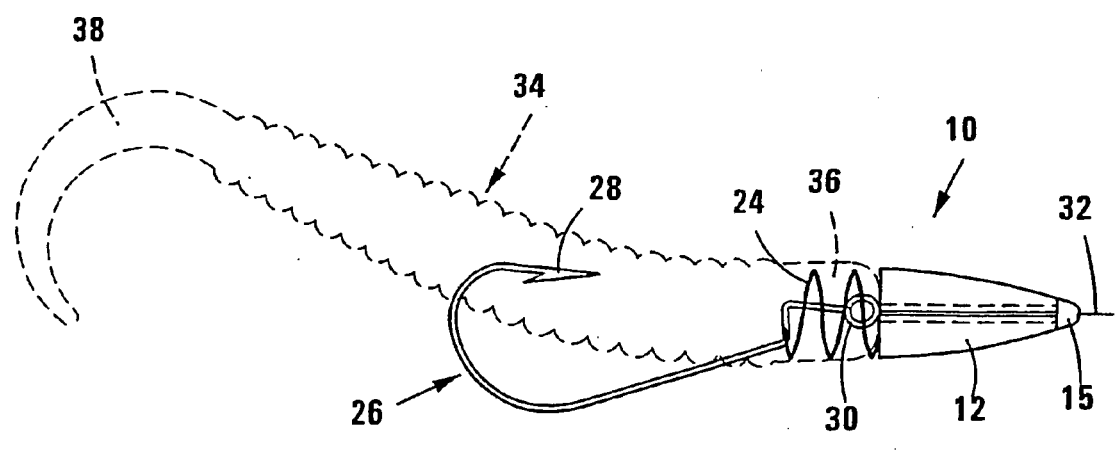

Referring now to FIGS. 10 to 12 of the drawings, reference numeral 26 indicates a fishing hook having a hook part 28 and a hook eye 30, and reference numeral 32 indicates a fishing line which is tied to the hook eye 30.

The sinker 12 is installed on the fishing line 32 by inserting the fishing line sideways through the slot 18 into the passage 16.

The helical element 14 is installed on the fishing line 32 by winding the fishing line through the gap between adjacent coils of the wire element. The front part 22 of the helical element 14 is then inserted into the passage 16 so that the coils of the front part 22 engage with the screw-thread 20 or with the surface defining the passage 16. In this condition the coils of the front part 22 close the slot 18, thereby retaining the fishing accessory 10 on the fishing line 32.

The locking member 15 is installed on the fishing line 32 by inserting the fishing line sideways through the slit 46 into the passage 44. In the first embodiment, shown in FIGS. 1 to 5 of the drawings, the locking member 15 is then screwed into the passage 16, with the threaded part 40 thereof engaging with the screw thread 21. In the second embodiment, shown in FIGS. 6 to 8 of the drawings, the locking member 15 is inserted into the passage 16 with the rear part 50 thereof engaging the surface defining the passage, with a friction fit. The locking member 15 is accurately displaced into a locking position in which the passage 44 is in register with the passage 16, and the slot 18 is out of register with the slot of the locking member 15.

An artificial fishing lure 34 (shown in dotted outline) having a nose 36 and a tail 38 is now installed on the fishing hook 26, as shown in FIG. 12 of the drawings. With the accessory 10 installed, this illustrates a Texas rigged lure in which the fishing hook 26 is inserted into the lure 34 so that a shank of the fishing hook, at the hook eye end thereof, passes longitudinally through the nose 36 of the lure, with the hook eye 30 being adjacent the nose. The end of the shank which is adjacent the hook part 28 of the fishing hook 26, protrudes from the side of the lure 34, and a barbed end of the fishing hook is inserted into the lure body, towards the tail end 38 thereof.

The accessory 10 is now slid along the fishing line 32 towards the lure 34 and rotated about the helix axis of the helical element 14, causing the rear part 24 of the helical element 24 to penetrate into the nose 36 and encircle the hook eye 30. This serves to attach the accessory 10 to the lure 34. In addition, it assists in holding the nose 36 of the lure in position on the fishing hook 26, in the hook eye region thereof, preventing the nose from sliding along the shank towards the hook part 28 of the fishing hook and cause so-called "wadding". Instead, the rear part 24 may be attached to the nose 36 by extending around the outside of the nose, with an inward bias.

The fishing accessory 10 described herein is versatile in that it allows a fisherman to change from one type of rigging to another without having to untie the fishing line 32 from the fishing hook 26. Thus, the components can be used to form a Texas rig as illustrated in FIG. 12 of the drawings. If desired, the sinker 12 can be unscrewed from the helical element 14 and removed from the line 32, to form a weightless rig. Furthermore, if desired, the sinker 12 can be installed on the fishing line 32 behind a swivel in the fishing line, the swivel being set back about 0.5 m from the fishing hook 26, thereby forming a Carolina rig. In the latter configuration the locking member 15 will again be installed on the fishing line 32 and inserted into the sinker 12 at the front end thereof, and a further component which is similar or identical to the locking member 15 installed onto the fishing line and inserted into the sinker at the rear end thereof, to engage with the screw-thread formation 20.

The body 12 may, instead of being of a heavy material such as lead, be of a buoyant material, to serve as a float instead of as a sinker.

The invention claimed is:

1. A fishing accessory for use with an artificial lure attached to a fishing hook secured to a fishing line, which comprises:
   a body defining a longitudinal passage in which a fishing line is receivable and defining a slot extending laterally from the passage to an outside of the body; and
   a resilient helical element defining a helical axis having front and rear ends, the helical element including (a) front body engagement part which is axially receivable, at least in part, within the passage of the body, with an interference fit between the helical element and a surface of the passage, holding the helical element in position in the passage, the body engagement part having coils which each have an inner diameter which is smaller than the outer diameter of a hook eye of a fishing hook thereby preventing the body engagement part from being slid rearwardly over the hook eye; and (b) a rear lure engagement part for engaging into the lure by rotation of the lure engagement part about the helical axis causing the lure engagement part to be screwed into the lure body, the lure engagement part comprising an elongate element having a helical shape and an inner diameter which is larger than the outer diameter of the hook eye thereby permitting the lure engagement part to be slid rearwardly over the hook eye, the combination of the differently sized body and lure engagement part coils holding the helical element in place with respect to the hook and thereby restricting displacement of the lure body along the hook shank to cause wadding or bunching of the lure body on the hook.

2. A fishing accessory as claimed in claim 1, wherein the diameter of the passage is greater than the width of the slot.

3. A fishing accessory as claimed in claim 1, which includes a locking member defining a longitudinal slot, the locking member being receivable on the body, and being arcuately displaceable between a receiving position in which the slot of the locking member is in register with the passage and the slot of the body, and a locking position in which the slot of the locking member is in register only with the passage of the body, and is out of register with the slot of the body.

4. A fishing accessory as claimed in claim 3, in which the locking member is a molding of plastics material.

5. A fishing accessory as claimed in claim 1, in which the body is a sinker.

6. A fishing accessory as claimed in claim 1, in which the body is a float.

7. A fishing accessory as claimed in claim 1, in which the helical element is a metal coil spring.

8. A fishing accessory for rigging a soft plastic fishing lure with a front nose, and a hook of the type having a front hook eye of a predetermined outer diameter tied to fishing line, a shank part, and a hook part, the accessory comprising:
   (a) a body with front and rear ends, the body having a longitudinal passage extending from the front to the rear and a lateral slot extending from the passage to the outside of the body, the slot being adapted for ingress and egress of the fishing line with respect to the passage; and
   (b) a resilient, unitary helical element defining a helical axis having front and rear ends, the helical element including:
      (i) a front, body engagement part for connecting the rear of the body, the body engagement part having coils which have an inner diameter which is smaller than the outer diameter of the hook eye; the coils being inserted into the body passage, and
      (i) a rear, lure engagement part for connecting the front end of the soft plastic lure, the lure engagement part having coils terminating in an insertion end for rotatably penetrating the soft plastic lure, the coils having an inner diameter which is larger than the outer diameter of the hook eye so that they slide over and surround the hook eye during connection; and
   whereby in use, the hook eye stops rearward movement of the body engagement part thereby holding the helical element in place with respect to the hook, and also thereby holding the soft plastic lure nose adjacent the hook eye and restricting rearward, wadding displacement of the soft plastic lure along the hook shank.

* * * * *

UNITED STATES PATENT AND TRADEMARK OFFICE
CERTIFICATE OF CORRECTION

PATENT NO. : 7,621,069 B2
APPLICATION NO. : 10/480088
DATED : November 24, 2009
INVENTOR(S) : Francis Archibald Holtzkampf It is certified that error appears in the above-identified patent and that said Letters Patent is hereby corrected as shown below:

Title Page, Item (76) Inventor: "Francis Archibald Holtskampf" should read --Francis Archibald Holtzkampf--.

Signed and Sealed this

Nineteenth Day of January, 2010

David J. Kappos
*Director of the United States Patent and Trademark Office*